125,696

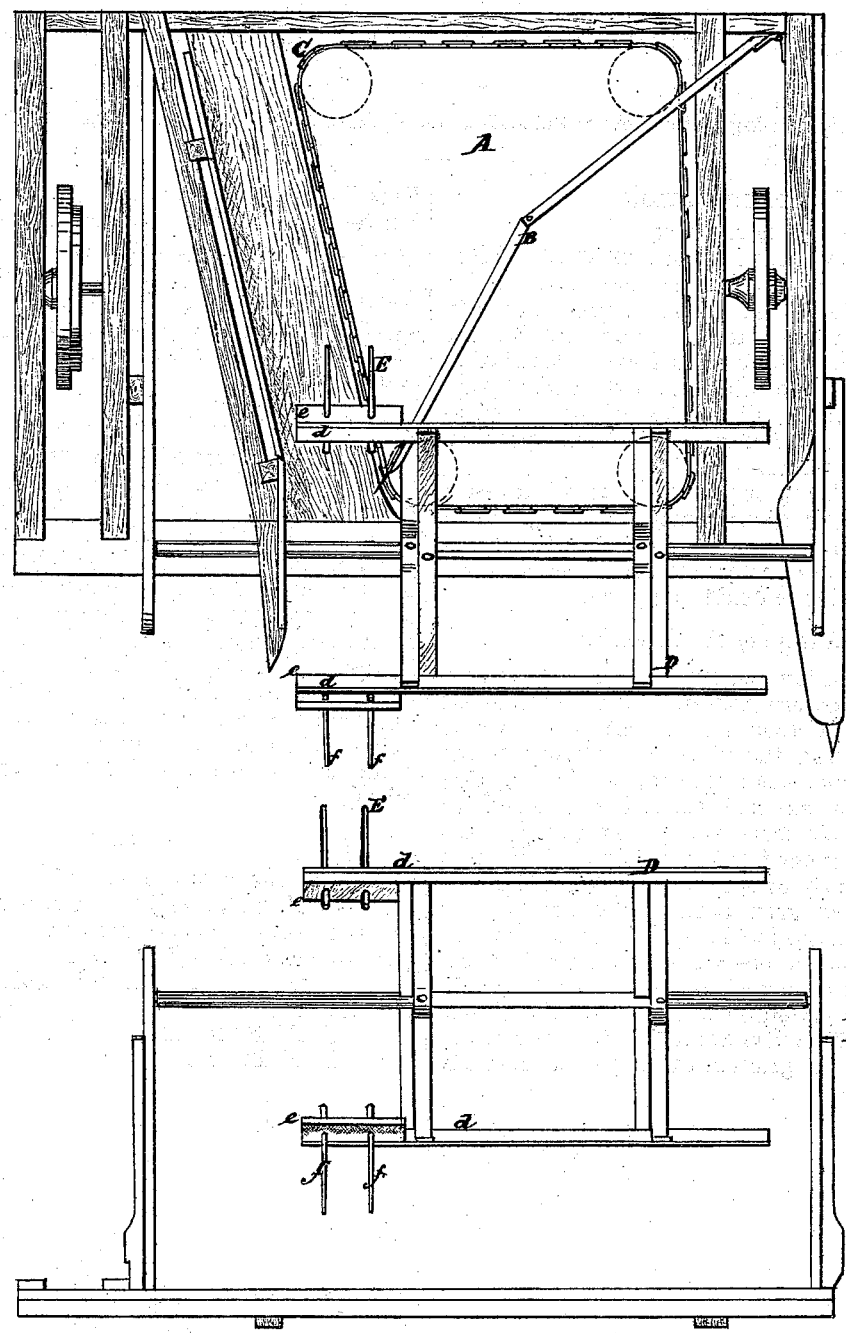

UNITED STATES PATENT OFFICE.

JACOB SEIBEL, OF MANLIUS, ILLINOIS.

IMPROVEMENT IN HARVESTER-RAKES.

Specification forming part of Letters Patent No. 125,696, dated April 16, 1872; antedated March 26, 1872.

SPECIFICATION.

*To all whom it may concern:*

Be it known that I, JACOB SEIBEL, of Manlius, in the county of Bureau and State of Illinois, have invented cetain Improvements in Harvesters; and I do hereby declare that the following is a full, clear, and exact description thereof, reference being had to the accompanying drawing and to the letters and figures marked thereon, which form part of this specification, and in which—

Figure 1 is top or plan view of a harvester embodying my improvement; and Fig. 2 is a front elevation of same.

Like letters of reference made use of in the several figures indicate like parts.

Nature of the Invention.

This invention relates to that class of harvesters which are provided with an automatic rake, carried upon an endless chain, which travels around the platform. Owing to the nature of such a mechanism, and the direction given to the rake as it turns from the front to ascend the platform to the rear, a small portion of the inner front edge of the platform is not sufficiently swept by the rake, and a portion of the cut grain at this point is apt to clog and accumulate to the serious hindrance and detriment of the operation of the mechanism, and the efficiency of the harvester. The object of this invention is to obviate the above-described difficulty, and to enable the rake to carry back the grain in a more perfect manner. This I accomplish by providing the reel of the harvester, at or opposite this point, with rake-teeth carried upon the revolving outer circumference of said reel, and so placed that the teeth will engage the cut grain and toss it back upon the platform, far enough, so that the rake moving around will catch and carry it on.

General Description.

A is the platform of the harvester. B is the automatic rake, carried around said platform by the endless chain C, in the direction of the arrows. D is the reel of the harvester, and E the auxiliary rakes, carried upon the bars $d$ of the reel. These auxiliary rakes engage the cut grain at the portion of the platform marked G, where a portion of the said grain is apt to be left by the rake B. The auxiliary rakes E consist of two or more teeth, $f$, radiating from the reel, as shown in the drawings, being attached to body or back pieces, $e$, which are in turn attached to the bars $d$ of the wheel.

Claim.

I claim the combination of the auxiliary rake or rakes E, reel D, platform A, and automatic rake B, substantially as and for the purpose shown and described.

JACOB SEIBEL. [L. S.]

Witnesses:
J. W. MUNDAY,
H. F. BRUNS.